Patented July 14, 1953

2,645,626

UNITED STATES PATENT OFFICE 2,645,626

THIXOTROPIC COATING COMPOSITION

Birger W. Nordlander and Robert E. Burnett, Schenectady, N. Y., assignors to General Electric Company, a New York corporation No Drawing. Application December 31, 1949, Serial No. 136,417

8 Claims. (Cl. 260—40)

This invention relates to thixotropic compositions, and more particularly to polymerizable thixotropic coating and filling compositions comprising a polymerizable liquid and a filler.

A problem of long standing encountered in factory practice in connection with the use of conventional varnishes for coating or filling applications is the excessive drainage from the coated or filled part after the varnish has been applied. A portion of this drainage occurs at room temperature immediately after the part has been removed from the treating tank because of the fluid nature of the conventional varnishes generally employed. This drainage continues until sufficient solvent has evaporated to cause the viscosity of the varnish on the surface or in the interstices of the treated object to become sufficiently high to enable it to remain in position. It is obvious that the nature of the process is such that too much of the varnish drains away from the top of the treated part and a surplus collects at the bottom of the part, resulting in a very uneven and undesirable ultimate distribution of the varnish base throughout the part. Further drainage occurs during the early stages of any baking process which might be involved, when the varnish base remaining in the treated part becomes increasingly fluid as the temperature is increased. This drainage will continue until the temperature is sufficiently high, and has been applied sufficiently long to cause the varnish to thicken or "skin over" due to polymerization reactions of one type or another, such as condensation, oxidation and addition reactions. Conventional varnishes also have a disadvantage in that they draw away from sharp corners and edges, leaving these regions practically bare.

The net result of methods of coating and filling in such a manner is very uneconomical utilization of the weight of varnish originally applied, only a fraction being retained. Furthermore, an undesirably uneven distribution of the varnish in the interstices and on the surface of the treated part results.

Where the problem of coating or filling electrical devices, such as for example, electrical coils, has been involved, the amount of material retained after a single application is in most cases insufficient to afford a structure having the required electrical and mechanical properties. Several successive applications and bakings are usually necessary, adding considerably to the cost of the treatment. In the case of open structures, such as electrical coils, a complete filling becomes impossible employing the coating and filling compositions heretofore known in the art, not only because of the fact that the inert, volatile solvent in the composition must be expelled after each application, but also because many voids are sealed off during the evaporation of the solvents. In many cases these voids cannot be filled by additional varnish regardless of how many subsequent treatments are applied to the structure. This causes the treated structure to have an unequal thermal conductivity from one part to another as well as a much lower overall heat dissipation rate as compared with a completely void-free structure. In high voltage equipment the presence of voids in the insulation also gives rise to internal corona discharge with resulting deterioration of the insulation.

Certain of the above difficulties can be eliminated by the use of so-called solventless varnishes. This term is intended in the present disclosure to cover compositions of matter which are polymerizable fluids substantially free of inert, volatile solvents such as those used in conventional varnishes, and which by the incorporation of suitable catalysts, may be caused to polymerize to form substantially infusible and insoluble materials without the necessity of taking up oxygen from the air and without forming volatile products.

Since the conversion from the fluid to the hard, infusible stage occurs with little or no loss of the weight of material applied in the coating or filling operation, it is possible, by the use of proper vacuum-pressure impregnating technique, not only to fill completely all the spaces in an open structure, such as a coil, but also to maintain this condition subsequently during the curing operation, provided that substantially no drainage of varnish occurs during the baking process.

Many of the solventless varnishes of the type with which the present invention is concerned, and which will be hereinafter more fully described, comprise fairly fluid, non-volatile compositions. Therefore, in comparison with the conventional varnishes containing highly viscous or solid bases, these solventless varnish compositions suffer the disadvantage that they do not become increasingly viscous on standing at room temperature by the evaporation of a volatile inert solvent. As a result an open structure coated or filled with such a solventless varnish composition will continuously suffer loss of the varnish by drainage after it has been withdrawn from the treating tank and before it has been polymerized by heating. Furthermore, in common with the conventional varnishes containing appreciable amounts of solvents, many of the solventless varnishes have the disadvantage that during the early stages of the curing process their viscosity is substantially reduced, further aggravating the drainage problem. The difficulties arising out of this property of the solventless varnishes in many cases have proved to be serious enough to offset the principal advantage in using the solventless varnishes for the filling of open structures.

It is an object of the present invention to provide liquid coating and filling compositions which will not drain from object prior to and during curing.

Another object of this invention is to provide coating and filling compositions which may be applied and cured without loss of the composition.

A further object of the present invention is to provide coating and filling compositions which when applied to objects will remain in situ before and during curing even on corners and sharp edges.

It has been discovered that the advantages in the use of solventless varnishes may be realized in coating and filling operations and at the same time the disadvantage of excessive drainage may be avoided by employing the compositions of this invention. These compositions may be converted by means of heat to an infusible and insoluble state and are suitable in general for coating and filling operations and particularly for the insulation of electrical equipment. After a coating of one of the present compositions has been applied to a part, little or no drainage of the composition from the part occurs, either at room temperature or at the elevated temperatures required for complete conversion of the composition to the infusible and insoluble state. The unusual combination of properties characterizing these compositions rests in the discovery that suitable quantities of certain specific fillers, in combination with solventless varnishes or polymerizable liquids, form compositions which are fluid as long as they are kept in an agitated condition but solidify shortly after agitation has ceased and will not flow either at room temperature or at temperatures up to about 150° C. unless mechanically disturbed before they have hardened by polymerization.

While it is well-known that the incorporation of fillers into a varnish will reduce the flow of the resulting mixture by reason of increased viscosity, this general property is not relied upon for the properties of the present compositions. The specific fillers which are here employed with solventless varnishes form thixotropic compositions capable of undergoing isothermal, reversible, sol-gel transformations, a fluid sol condition existing as long as the mixture is agitated, the sol reverting to a gel within a very short time after agitation has ceased. However, upon heating the gel it polymerizes into an infusible product which is no longer capable of reversion to the fluid sol state. The system may be simply expressed by the following relationship:

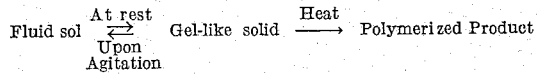

The term "thixotropy" is used herein to denote the property of a fluid filler-liquid composition to revert rapidly on standing into a gel-like mass having sufficient cohesive strength to withstand distortion by gravitational force when suspended freely as in an inverted receptacle or on a coated object. The gel is also of such a nature that it can be fluidified by the application of mechanical agitation as by shaking, stirring, vibrating etc. The property of thixotropy as understood herein is thus characterized by a reversible isothermal sol ⇌ gel transition.

The compositions referred to above as solventless varnishes which are employed in combination with specific fillers to form the thixotropic composition of this invention are polymerizable fluids comprising an unsaturated alkyd resin. These liquid unsaturated alkyd resins are the reaction products of polyhydric alcohols, mixtures of polyhydric alcohols or mixtures of polyhydric and monohydric alcohols, and an ethylenically unsaturated polycarboxylic acid or a plurality of polycarboxylic acids, one of which, at least, is unsaturated polycarboxylic acid, the resinous material having an acid value of up to 60 and preferably between 45 and 60. Examples of such polyhydric alcohols are ethylene glycol, di- and tri-ethylene glycols, propylene glycol, trimethylene glycol, tetramethylene glycol, pentamethylene glycol, glycerine or pentaerythritol in combination with a monohydric alcohol etc. Examples of unsaturated polycarboxylic acids are maleic, fumaric, and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic and phthalic acids.

In addition to the above unsaturated alkyd resins, the polymerizable fluids which are used in the present compositions may contain polymerizable substances such as, for example, esters of unsaturated monohydric alcohols and polycarboxylic acids, including unsaturated polycarboxylic acids, halogenated aromatic polycarboxylic acids and polybasic inorganic acids. Examples of such substances are diallyl phthalate, diallyl succinate, diallyl maleate, diallyl fumarate, diallyl itaconate, diallyl chlorophthalates, and triallyl phosphate. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate.

The thixotropic compositions of this invention may be converted into an infusible insoluble state by means of heat alone, for example, by curing parts coated or filled with these compositions at temperatures of from about 80° C. to about 150° C., or more preferably from about 100° C. to about 125° C. However, for practical reasons, it is desirable to incorporate a polymerization catalyst in order to accelerate the polymerization of the coating or filling compositions. Any of the catalysts known to those skilled in the art may be employed. Examples of such catalysts which have been found to be particularly suitable are benzoyl peroxide, tertiary butyl perbenzoate, di-tertiary butyl diperphthalate, and tertiary butyl hydroperoxide. Any suitable amount of catalyst may be used, but in general the catalyst concentration will be within the range of from about 0.5 to about 2.0 per cent by weight of the polymerizable liquid.

It has been found that a new class of thixotropic solventless varnishes may be produced by using in conjunction with the alkyd type materials as described above a material comprising glycol esters of methacrylic acid. Examples of such materials are the mono-, di-, tri- and tetra-ethylene glycol dimethacrylates.

It has been found that metallic oxides such as red iron oxide ($Fe_2O_3$), nickel oxide ($Ni_2O_3$), rutile and anatase titanium oxide ($TiO_2$), flint or silica ($SiO_2$) and zinc oxide (ZnO) are very useful in producing thixotropic solventless varnishes contain alkyd resins and the dimethacrylate esters as above. In general the fillers may be used in proportions ranging from about 45 per cent to 70 per cent by weight of the thixotropic solventless varnish composition.

Other thixotropic solventless varnish-filler compositions are disclosed in copending applications Serial Nos. 136,411, 136,413, 136,412, 136,415, 136,416, 136,418, filed concurrently herewith and assigned to the same assignee as the present application.

The following examples are illustrative of the preparation of thixotropic mixtures or compositions using the above materials.

A basic resinous or solventless varnish was prepared using the following ingredients which were thoroughly mixed together, all parts being by weight.

|  | Parts |
|---|---|
| Tetraethylene glycol dimethacrylate | 64.0 |
| Diethylene glycol maleate | 36.0 |
| Ditertiary-butyl diperphthalate | 1.0 |
| Quinone | 0.05 |

The above composition will hereinafter be known as Compound B.

As described in copending application Serial No. 136,414, filed concurrently herewith and assigned to the same assignee as the present application, the small amount of tertiary butyl catechol often present in the maleate resin as an anti-skinning agent tends to shorten the stable life of the thixotropic compositions made therefrom. As further described in the above-cited application, a small amount of quinone counteracts the life-shortening property of the tertiary butyl catechol which occurs when combined with polymerization initiators. While the above Compound B contains quinone, it will be understood that the quinone is not an essential ingredient for producing thixotropy but is present merely as an agent which imparts a longer shelf life to the mixture.

| Example | 1 | 2 | 3 |
|---|---|---|---|
| Compound B | 48 | 48 | 48 |
| Red Iron Oxide ($Fe_2O_3$) | 52 | 52 | 52 |

Red iron oxide, when mixed with the Compound B, gave a highly thixotropic mixture. In Example 1 the $Fe_2O_3$ was used as received; in Example 2 it was dried for twenty-one hours at 105° C., while in Example 3 it was dried for 21 hours at 200° C. When a glass rod was dip-coated in the above materials, there was no drainage of the coating after 16 hours at room temperature. Neither was there any drainage after 16 additional hours at 100° C.

| Example | 4 | 5 |
|---|---|---|
| Compound B | 40 | 40 |
| Chromic Oxide | 60 | 60 |

The chromic oxide in Example 4 was used as received and contained about 0.3 per cent water; that in Example 5 was dried at 200° C. for 21 hours. In both of the above cases a highly thixotropic mixture resulted when the materials were blended together. A glass rod dip-coated in the mixture showed no drainage after 16 hours at room temperature or after 16 hours at 100° C.

| Example | 6 | 7 |
|---|---|---|
| Compound B | 46 | 46 |
| Nickel Oxide ($Ni_2O_3$) | 54 | 54 |

The nickel oxide of Example 6 was used as received whereas that of Example 7 was dried for 21 hours at 200° C. The above ingredients, in each case, when mixed thoroughly together gave a mixture which exhibited pronounced thixotropic properties. A glass rod dip-coated in the materials showed no drainage after 16 hours at room temperature and 16 hours at 100° C.

| Example | 8 | 9 | 10 | 11 |
|---|---|---|---|---|
| Compound B | 46 | 46 | 52 | 52 |
| Titanium Dioxide ($TiO_2$) | 54 | 54 | 48 | 48 |

The titanium dioxide in Examples 8 and 9 was of the rutile type. In Example 8 the filler was used as received whereas in Example 9 it was dried for 24 hours at 200° C. In Examples 10 and 11 the titanium dioxide was of the anatase type, that in Example 10 being used as received whereas that in Example 11 was dried at 200° C. for 24 hours. In all of the above examples the material which resulted from mixing the Compound B with the filler exhibited pronounced thixotropic properties. Coatings formed on glass rods dipped in the mixture showed no drainage after 16 hours at room temperature and 16 hours at 100° C.

| Example | 12 | 13 |
|---|---|---|
| Compound B | 31 | 31 |
| Flint ($SiO_2$) | 69 | 69 |

The flint in Example 12 was used as received while that in Example 13 was dried for 24 hours at 200° C. before being used. Again the mixture produced by mixing the ingredients set forth in Examples 12 and 13 exhibited pronounced thixotropic properties. Coatings formed on glass rods dipped in the mixture showed no drainage after 16 hours at room temperature and 16 hours at 100° C.

| Example | 14 | 15 |
|---|---|---|
| Compound B | 46 | 46 |
| Zinc Oxide (ZnO) | 54 | 54 |

The zinc oxide of Example 14 was used as received while that in Example 15 was previously dried for 24 hours at 200° C. The compositions resulting from mixing the ingredients of the above examples were very thixotropic in character. Glass rods dipped in the composition resulting from the mixing of the ingredients of Examples 14 and 15 when hung at room temperature for 16 hours showed no observable drainage. Neither was there any observable drainage after 16 hours at 100° C.

What we claim as new and desire to secure by Letters Patent of the United States is:

1. A thixotropic coating composition comprising a polymerizable liquid comprising a liquid unsaturated alkyd resin obtained by the esterification of a mixture of ingredients comprising a polyhydric alcohol and an ethylenically unsaturated polycarboxylic acid and a polymerizable glycol ester of methacrylic acid and a filler selected from the class consisting of $Fe_2O_3$, $Cr_2O_3$, $ZnO$, $TiO_2$, $Ni_2O_3$ and $SiO_2$, the aforesaid filler comprising, by weight, from 45 to 70 percent of the total weight of the thixotropic composition.

2. A thixotropic coating composition comprising a polymerizable fluid comprising a liquid unsaturated alkyd resin obtained by the esterification of a mixture of ingredients comprising a polyhydric alcohol and an ethylenically unsaturated polycarboxylic acid and a polymerizable ethylene glycol ester of methacrylic acid and a filler selected from the class consisting of $Fe_2O_3$, $Cr_2O_3$, $ZnO$, $TiO_2$, $Ni_2O_3$ and $SiO_2$, the aforesaid filler comprising, by weight, from 45 to 70 percent of the total weight of the thixotropic composition.

3. A thixotropic coating composition comprising a polymerizable fluid comprising tetraethylene glycol dimethacrylate and liquid diethylene glycol maleate obtained by the esterification of a mixture of ingredients comprising diethylene glycol and maleic anhydride and a filler selected from the class consisting of $Fe_2O_3$, $Cr_2O_3$, $ZnO$, $TiO_2$, $Ni_2O_3$ and $SiO_2$, the aforesaid filler comprising, by weight, from 45 to 70 percent of the total weight of the thixotropic composition.

4. A thixotropic coating composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising $Fe_2O_3$, the aforesaid filler comprising, by weight, from 45 to 75 percent of the total weight of the thixotropic composition.

5. A thixotropic coating composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising $Cr_2O_3$, the aforesaid filler comprising, by weight, from 45 to 70 percent of the total weight of the thixotropic composition.

6. A thixotropic coating composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising $ZnO$, the aforesaid filler comprising, by weight, from 45 to 70 percent of the total weight of the thixotropic composition.

7. A thixotropic coating composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising $TiO_2$, the aforesaid filler comprising, by weight, from 45 to 70 percent of the total weight of the thixotropic composition.

8. A thixotropic coating composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising $SiO_2$, the aforesaid filler comprising, by weight, from 45 to 70 percent of the total weight of the thixotropic composition.

BIRGER W. NORDLANDER.
ROBERT E. BURNETT.

References Cited in the file of this patent

UNITED STATES PATENTS

| Number | Name | Date |
| --- | --- | --- |
| 2,086,714 | Hucks | July 13, 1937 |
| 2,407,479 | D'Alelio | Sept. 10, 1946 |
| 2,467,526 | Harris | Apr. 19, 1949 |
| 2,482,086 | Foster | Sept. 20, 1949 |
| 2,537,520 | Eger | Jan. 9, 1951 |
| 2,555,551 | Kropa | June 5, 1951 |

OTHER REFERENCES

"Industrial Chemistry of Colloidal and Amorphous Materials," by Lewis et al., published 1943 by the MacMillan Co., pages 243 and 327.